C. W. LEVALLEY.
TRANSMISSION GEARING.
APPLICATION FILED JAN. 9, 1912.
1,151,482.
Patented Aug. 24, 1915.
2 SHEETS—SHEET 1.
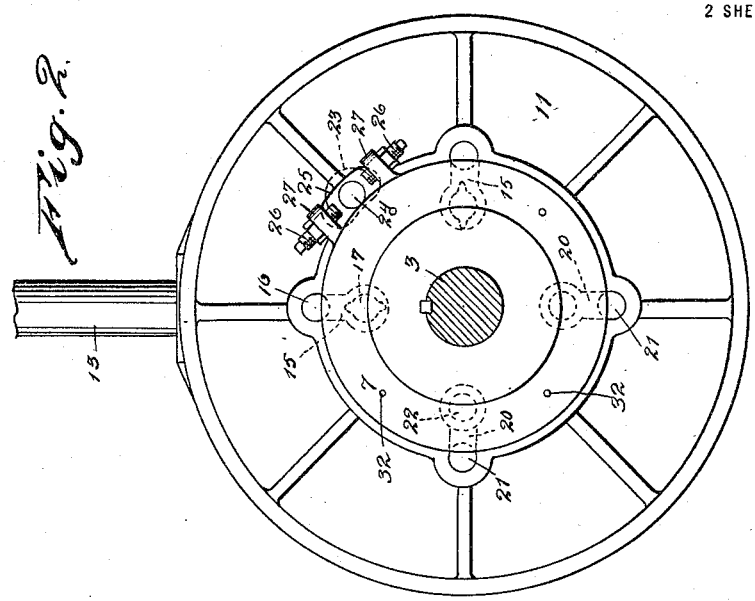
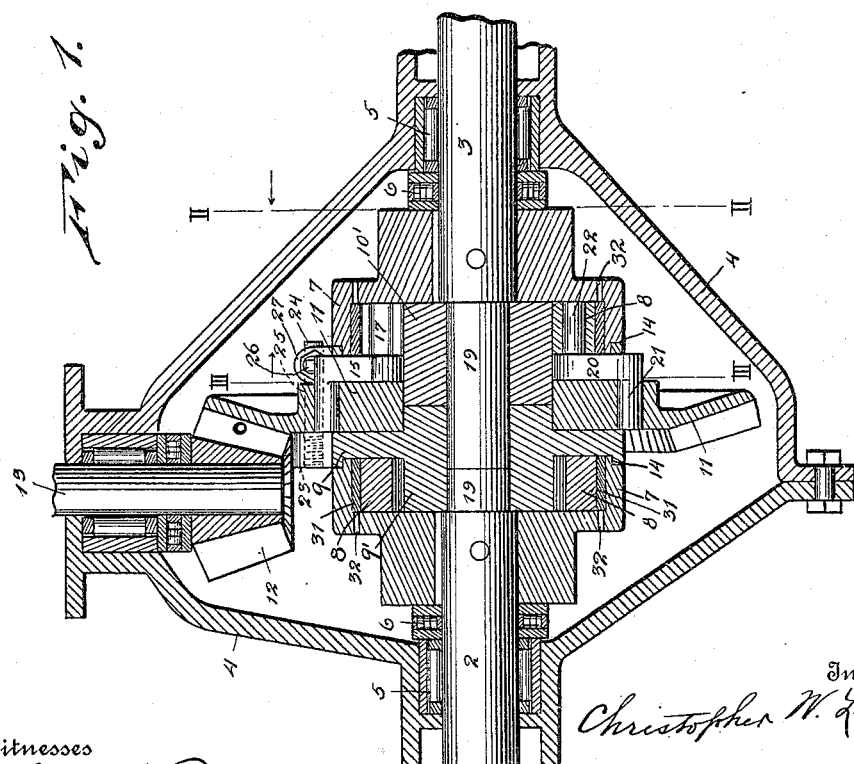
Witnesses
J. Milton Jester.
L. C. Brady
Inventor
Christopher W. Levalley
By John S. Barker
his Attorney

C. W. LEVALLEY.
TRANSMISSION GEARING.
APPLICATION FILED JAN. 9, 1912.

1,151,482.

Patented Aug. 24, 1915.
2 SHEETS—SHEET 2.

Witnesses
J. Milton Lester
L. C. Brady

Inventor
Christopher W. Levalley
By John S. Barker
his Attorney

UNITED STATES PATENT OFFICE.

CHRISTOPHER W. LEVALLEY, OF MILWAUKEE, WISCONSIN.

TRANSMISSION-GEARING.

1,151,482.     Specification of Letters Patent.     Patented Aug. 24, 1915.

Application filed January 9, 1912. Serial No. 670,156.

*To all whom it may concern:*

Be it known that I, CHRISTOPHER W. LE-VALLEY, a citizen of the United States, residing at Milwaukee, in the county of Milwaukee and State of Wisconsin, have invented certain new and useful Improvements in Transmission-Gearing, of which the following is a specification.

My invention relates to that class of transmission gearing, interposed between a driving shaft or member and a divided shaft or member, in which provision is made for simultaneously driving both sections of the shaft with like speed, or, when the shaft sections are turning at different speeds, driving only the more slowly revolving section, this latter section remaining in driving connection with the motor, while the other is temporarily disconnected therefrom and free to revolve at a speed greater than that of the section connected with the source of power. Mechanisms of this kind, broadly considered, are well known in the art and have been applied to the divided driven wheel shafts or axles of motor vehicles.

The invention has for its object to improve gearing of this kind, more especially by providing it with novel means for positively preventing the faster turning shaft section, which should be free from driving connection with the motor, from becoming connected either therewith or with the other section of the shaft, through the overrunning of the fast moving section, throwing into operating connection gearing that unites these parts.

A practical embodiment of my invention is illustrated in the accompanying drawings and will be described in the following specification.

Figure 3:
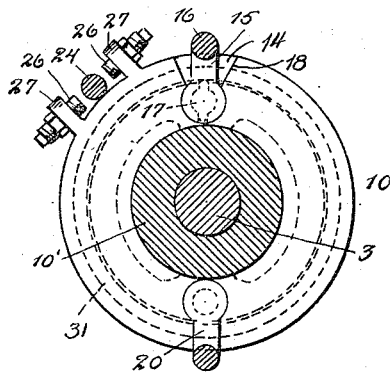
Figure 4:
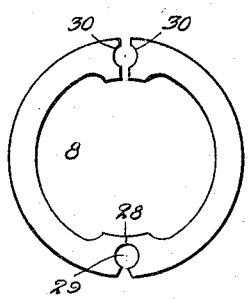
Figure 5:
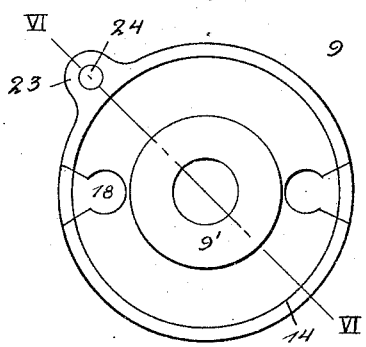
Figure 6:
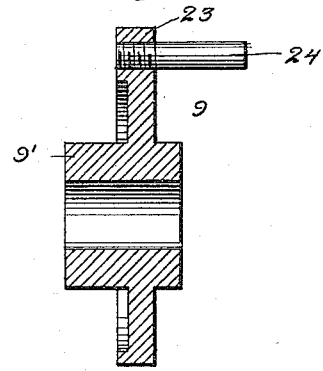
Figure 7:
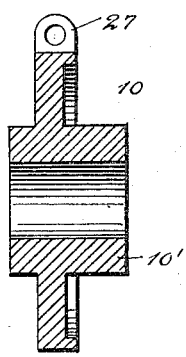
Figures 8, 9:
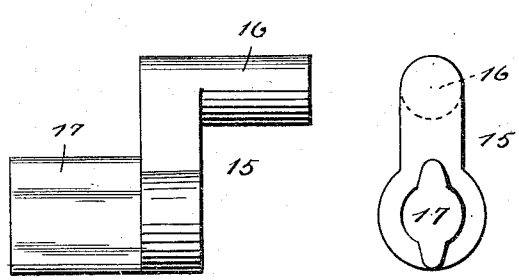

In the drawings, Figure 1 is a horizontal sectional view of a transmission gearing embodying my invention and adapted to be used in driving a motor vehicle. Fig. 2 is a transverse sectional view taken on the line II—II of Fig. 1, the inclosing casing for the gearing being omitted. Fig. 3 is a transverse sectional view taken on the line III—III of Fig. 1. Fig. 4 is a detail view, in side elevation, of the friction shoes of the clutch. Fig. 5 is a face view of one of the carrying or facing disks. Fig. 6 is a section taken on the line VI—VI of Fig. 5. Fig. 7 is a sectional view of the other carrying or facing disk. Fig. 8 is a detached view, enlarged, of the clutch-expanding lever. Fig. 9 is an end view of this lever.

In the drawings, 2, 3, indicate respectively the sections of a divided driven shaft which may be the rear axle of an automobile. The inner ends of these shaft sections enter a suitable casing, 4, which is provided with both supporting and thrust bearings for the shaft, these being designated respectively 5 and 6. The ends of the shaft sections preferably abut and are reduced in diameter, as indicated at 19, though these features, while practically desirable, are not essential to my invention. To each section of the shaft there is secured a part of the driving mechanism, preferably in the form of a friction shell 7, the inner overhanging flange of which forms a chamber in which is mounted an expansible friction shoe 8. Each shoe is preferably formed of a pair of semi-circular segments, in which is seated one of the driving members that will later be described. The opposite ends, 30, of the segments of the friction ring are adapted to come close together but not into engagement, and are shaped to constitute seats with which engages a part of a shoe-expanding lever, that also serves as a driving member, to be described.

The clutch shoes 8 may engage directly with the inner surface of the shaft-connected friction clutch element 7. I prefer, however, to line the flange of this part with a close fitting metal ring, 31, formed of a metal that will resist wear and also insure good frictional engagement with the shoes 8. The web of the shell may be provided with apertures 32 directly back of the lining 31 to permit the insertion of a tool which may be employed to remove the lining whenever for any purpose this is desirable.

Each friction shell 7 is provided with a hub by which it is secured to its respective shaft section and which is preferably secured to the unreduced part of the shaft immediately adjacent to the reduced section 19 thereof. This arrangement brings the inner edges of the friction shells opposite each other and close together, but not in contact, and arranged between them are two disks 9, 10, and the driving gear 11. The disks are formed respectively with elongated hubs 9′, 10′, which are loosely mounted upon the reduced portions of the shaft sections and occupy the entire space between the hubs of the friction shells 7. The disks are arranged respectively close against the edges of the overhanging flanges of the friction shells and serve as face or closing plates for the chambers in which are located the friction shoes 8. Between the disks 9 and 10, and preferably mounted loosely upon the hubs thereof, is the main drive gear of the mechanism, in the form of invention illustrated, it being a bevel wheel 11 with which meshes the bevel pinion 12 upon the motor driven shaft 13.

I prefer that the overhanging edges of the friction shells and the disks constituting the face plates closing the chambers therein, should meet in rabbet joints 14, as indicated in Fig. 1, in order to assist in centering the mechanism and adding strength to the friction shells. It will be seen that when these parts are interlocked by rabbet joints such as described, the disks 9 and 10 assist in sustaining the outward thrust imparted by the friction shoes when forced into frictional engagement with the shells.

In order to expand the friction shoes so that they shall engage with the shells 7, I employ levers 15, preferably one for each friction shoe. Each lever is mounted in a recess 18 formed in a disk, 9 or 10, which is shaped so as to form a closely fitting bearing or seat therefor and at the same time permit the lever to have the desired freedom of movement necessary to perform its functions. The lever is, when viewed edgewise, Z-shape in configuration, having the main central portion or body that is mounted in the recess 18, a laterally projecting pin or stud 16 seated in an aperture in the web of the bevel gear 11, and a laterally projecting winged or expanded head 17 that lies between the ends 30 of the friction shoe. Whenever the lever 15 occupies a radial position with reference to the driven shaft or axle, the head portion 17 thereof so lies between the ends of the friction shoe that the latter contracts and springs away from the wall of the friction shell. On the other hand, when the lever is rocked and occupies an inclined position, slanting either one way or the other, the head 17 engages with the ends 30 of the shoe and separates them, forcing the shoe into frictional engagement with the flange of the shell 7. It will be observed that there is one of the shoe-expanding levers for each shoe, one seated in the disk 9 and the other in the disk 10, and that each has engagement, through its pin or stud 16 with the driving gear or bevel wheel 11. The levers 15, 15, serve as elements in the train of power transmission mechanism between the driving shaft 13 and the driven shaft 2, 3. While a single lever 15 for each shaft section might be sufficient as a driving element, I deem it advisable to interpose between the bevel gear and each friction shoe a pair of driving members, one being the shoe expanding lever already described and the other a lever 20 preferably situated diametrically opposite the lever 15. This second driving lever is similar to the lever 15 except that it does not have the winged expanded head 17, but instead is provided with a cylindrical pin 22 that occupies the aperture 29 in the friction shoe 8 formed in the ends 28 thereof. The lever 20 is also formed with a pin or stud 21 fitting an aperture in the driving bevel gear 11.

One of the disks, that designated 9 in the drawings, is provided with a seat 23, preferably eccentrically disposed, for a pin 24 that is mounted so as to be parallel with the axis of the driven shaft, and extends through a slot 25 formed in the bevel gear 11 and has its free end situated between stops or contact pieces 26, 26, carried by the disk 10. These stops are preferably in the form of screw-threaded rods adjustably seated in bearings 27.

The operation of the gearing may now be set forth. Whenever the two sections of the shaft, 2, 3, are being driven uniformly, as when the vehicle is moving along a straight line, power from the shaft 13 is transmitted through the bevel gear 11, the shoe-expanding and driving levers connected therewith and the friction shoes, to both shells 7, which are connected with the shaft sections. Should one of the sections of the driven shaft be caused to revolve more rapidly than the other, as is the case when the vehicle turns, the section that is turning the more slowly remains in driving connection with the motor, while the more rapidly revolving section has its driving connection with the motor temporarily broken or interrupted, leaving such section free to turn independently of the other section, and also of the motor, so long as it the more rapidly revolves. Should its speed become the same as or less than that of the other shaft it is immediately and automatically again brought into driving connection with the motor. The disengagement of the more rapidly revolving section of the driven shaft from the motor is effected as follows: The friction shell connected therewith runs forward, relative to the driving bevel gear 11, carrying with it its friction shoe. This causes a slight rocking of the shoe-expanding lever, as it is, by the forward movement of the shoe, brought from the inclined position it occupied to a radial position, on assuming which latter position it releases the friction shoe from driving engagement with its shell 7. However, in mechanisms of the kind to which my invention belongs, there is necessarily always some friction between the shoe and its shell, and this friction will sometimes cause, unless provision be made to prevent, the shoe to move forward beyond the central or neutral position of release from the friction shell, whereupon the lever 15 will be rocked, turning the head 17 thereof into position to again expand the shoe— it now being inclined in a direction opposite to that it before occupied when both sections of the shaft were being simultaneously driven—with the result that the two sections of the driven shaft become connected and the shaft or axle operates as though formed of a single unitary piece. To positively prevent this overrunning of the friction shoe and the consequent connection of the two sections of the shaft or axle, the pin 24, carried by one of the disks, 9 or 10, and engaging with the bearings or abutments carried by the other, is employed. When the faster moving shaft section tends to carry forward its friction shoe and connected disk, as just described, such movement does not progress sufficiently far to tilt the lever and expand the shoe before the end of the pin 24 and one of the stops 26 come into engagement. When this takes place further forward movement of the loose shoe and directly connected parts is prevented, since one of the elements of engagement, either the pin 24 or the stop with which it engages, accordingly as one section or the other of the shaft is turning the more rapidly, is connected with the slower moving and motor connected shaft section and thus serves to arrest the forward movement of the loose friction shoe and to positively hold it in a neutral position, that is to say, in such position that the shoe and shell are out of working frictional engagement.

It is evident that by the mechanism I have described the driven shaft may be turned in either direction, that is to say, driven either forward or backward, accordingly as the drive shaft 13 turns.

While I have illustrated the drive wheel or gear 11 as being a bevel wheel it will be understood that the invention is not limited to a gear of that particular kind, a bevel gear being chosen as merely illustrative of a driving gear, located, with reference to the other parts of the mechanism, as shown in the drawings and herein described.

I have in this specification described friction clutch connections between the driving gear 11 and the sections of the driven shaft, and my present invention comprises the specific mechanism constituting the clutch shown. It will be understood, however, that for some purposes of the invention the friction clutch mechanism herein shown and described is merely illustrative of a clutch or connecting device, broadly considered, whether specifically like that shown or mechanically its equivalent.

It will be seen that the meeting ends of the two shaft sections are situated to one side of the plane of the driving gear 11 and this arrangement is for the purpose of positively holding the shaft sections in alinement with each other by a part of the mechanism other than the driving gear itself.

What I claim is:—

1. In a transmission gearing, the combination of a divided driven shaft, a clutch member carried by each section of the shaft, a drive gear supported between the shaft-connected clutch members, shoes for engaging respectively with the said clutch members, loosely supported disks, interposed respectively between the said drive gear and one of the clutch members, and means for controlling the operations of the clutch shoes, mounted respectively in the said disks and each connected with the drive gear.

2. In a transmission gearing, the combination of a divided driven shaft, a clutch member carried by each section of the shaft, having an overhanging flange forming a chamber, a drive gear supported between the shaft-connected-clutch members, shoes for engaging respectively with the said clutch members located in the said chambers therein, loosely supported disks constituting face plates closing the chambers in the clutch members, the disks being interposed respectively between the drive gear and the clutch members, and levers for controlling the operations of the clutch shoes, mounted respectively in the said disks and each connected with the drive gear.

3. In a transmission gearing, the combination of a divided driven shaft, a clutch member carried by each section of the shaft and each formed with an overhanging flange that incloses a chamber, clutch shoes for engaging with the said clutch members located in the said chambers, disks constituting face plates closing the chambers in the said clutch members, a central drive gear interposed between the said disks and clutch-shoe-operating means connected with the central gear and extending through the said disks to engage with the clutch shoes.

4. In a transmission gearing, the combination of a divided driven shaft, a friction shell formed with an overhanging flange carried by each section of the shaft, friction shoes mounted within the shells for engaging the said flanges thereof, disks arranged opposite the inner ends of the said friction shells, a central drive gear located between the disks, and shoe-expanding levers seated in the said disks and having engagement with the central drive gear and respectively with the friction shoes.

5. In a transmission gearing, the combination of a divided driven shaft, a shell-like clutch member carried by each section of the shaft, clutch shoes located within the shells of the clutch members, face plates covering the open ends of the shells of the clutch members and having rabbet joint connections therewith, a central drive gear interposed between the face plates, and shoe-operating means connected with the said drive gear.

6. In a transmission gearing, the combination of a divided driven shaft, a clutch member carried by each section of the shaft, clutch shoes for engaging with the clutch members, a central drive gear supported from the shaft between the said clutch members, disks interposed respectively between the drive gear and the said clutch members, means for controlling the operations of the clutch shoes mounted respectively in the said disks and each connected with the drive gear, and means carried by the said disks and extending across the said drive gear for maintaining in a released condition the clutch shoe whenever the shaft section with which it is associated revolves faster than the other section.

7. In a transmission gearing, the combination of a divided driven shaft, a clutch member carried by each section of the shaft, clutch shoes for engaging with the clutch members, a central drive gear, disks interposed between the drive gear and the said clutch members, means for controlling the operations of the clutch shoes connected with the drive gear and supported respectively in the said disks, and interengaging means carried respectively by the said disks and arranged to positively maintain in a released condition the clutch shoe whenever the shaft section with which it is associated revolves faster than the other section.

8. In a transmission gearing, the combination of a divided driven shaft, a clutch member carried by each section of the shaft, clutch shoes for engaging with the clutch members, a central drive gear, disks loosely supported upon the driven shaft and arranged between the said drive gear and the clutch members respectively, clutch-shoe-controlling means mounted in the said disks and connected with the drive gear, a pin supported by one of the disks and extending across the drive gear, and stops between which the said pin lies carried by the other disk, the said pin and stops being arranged to maintain in a released condition the clutch shoe whenever the shaft section with which it is associated revolves faster than the other section.

9. In a transmission gearing, the combination of a divided driven shaft, each section of which carries a clutch member, a drive gear, clutch shoes for engaging respectively with the said clutch members, means for controlling the operations of the clutch shoes connected respectively with the drive gear, supports for the said shoe-operating means arranged on opposite sides of the drive gear, a pin carried by one of the supports extending across the drive gear and adjustable stops between which the said pin lies carried by the other support, said pin and stops being arranged to maintain in a released condition the clutch shoe whenever the shaft section with which it is associated revolves faster than the other section.

10. In a transmission gearing, the combination of a divided driven shaft, a clutch member carried by each section of the shaft, a pair of disks covering the inner ends of the said clutch members and having hubs mounted loosely upon the end portions of the shaft sections and occupying the space between the hubs of the clutch members, clutch shoes for engaging with the said clutch members, a central drive gear loosely supported upon the hubs of the said disks and located between the latter, levers for controlling the operations of the clutch shoes supported in the said disks and connected with the drive gear, a pin supported by one of the disks and extending across the drive gear, and adjustable stops between which the pin is located carried by the other disk.

CHRISTOPHER W. LEVALLEY.

Witnesses:
JOHN S. BARKER,
GEO. B. PETTS.

Copies of this patent may be obtained for five cents each, by addressing the "Commissioner of Patents, Washington, D. C."